US006862792B2

(12) United States Patent  
Gumbe (10) Patent No.: US 6,862,792 B2  
(45) Date of Patent: Mar. 8, 2005

(54) METHOD OF ASSEMBLING A DEVELOPING APPARATUS (75) Inventor: Eiji Gumbe, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 154 days.

(21) Appl. No.: 10/383,662

(22) Filed: Mar. 10, 2003

(65) Prior Publication Data

US 2004/0177487 A1 Sep. 16, 2004

(51) Int. Cl.[7] .................................................. B23Q 3/00
(52) U.S. Cl. ...................... 29/464; 29/469; 29/895.22; 492/18
(58) Field of Search ................... 29/464, 469, 895.22, 29/271, 281.1, 281.5; 492/18, 38, 47; 399/279

(56) References Cited

U.S. PATENT DOCUMENTS

| | | | | |
|---|---|---|---|---|
| 3,390,450 A | * | 7/1968 | Checki, Jr. et al. | 29/464 |
| 3,550,672 A | * | 12/1970 | Fastert et al. | 29/271 |
| 3,900,732 A | * | 8/1975 | Costales | 29/271 |
| 4,555,840 A | * | 12/1985 | Nakamura | 29/271 |
| 4,633,810 A | * | 1/1987 | Martin | 29/464 |
| 5,325,151 A | * | 6/1994 | Kimura et al. | 399/279 |
| 5,646,721 A | * | 7/1997 | Sugihara et al. | 399/279 |
| 6,105,241 A | * | 8/2000 | Ogle | 29/281.5 |
| 6,401,319 B1 | * | 6/2002 | Hicks et al. | 29/464 |
| 6,438,837 B1 | * | 8/2002 | Berry et al. | 29/464 |
| 6,450,584 B2 | * | 9/2002 | Brinker et al. | 29/469 |
| 6,519,827 B1 | * | 2/2003 | Hayashi et al. | 29/464 |
| 2002/0002829 A1 | * | 1/2002 | Ranze et al. | 29/464 |

FOREIGN PATENT DOCUMENTS

JP        11-084984 A        3/1999

* cited by examiner

Primary Examiner—David P. Bryant  
(74) Attorney, Agent, or Firm—Foley & Lardner LLP (57) ABSTRACT A method of assembling a developing apparatus comprises, forming a recess in the outer circumference of a pair of holding members, fitting a first positioning pin of an adjustment jig into the recess without a clearance, after the fitting, fitting a concave support member on a second positioning pin without a clearance, and positioning and mounting them, after the fitting, separating the first and second positioning pins of the adjustment jig from the recess and the support member, after the separation, assembling a pair of holding members in one body with a predetermined interval, and after the assembly, mounting a plurality of developing rollers by fitting both ends of the center shaft into the recess of the pair of holding members and the concave support member, respectively.

6 Claims, 9 Drawing Sheets

METHOD OF ASSEMBLING A DEVELOPING APPARATUS

BACKGROUND OF THE INVENTION

The present invention relates to a method of assembling a color developing apparatus provided in an electrophotographic copier, for example.

Some developing apparatuses of this type have a rotatable holding unit and a plurality of developing units arranged over the rotating direction of the holding unit.

Each of the plurality of developing units contains a different color toner and has a developing roller. These developing units are sequentially moved to the developing position by the rotation of the holding unit. An electrostatic latent image formed on a photoconductor is moved to the developing position by the rotation of the photoconductive element. A first color toner is supplied to the latent image by the rotation of the developing roller, and a first color toner image is formed. The toner image is transferred to an intermediate transfer unit, for example.

After the first color toner image is formed, the holding unit rotates, the developing unit is moved to the developing position, and a second color toner image is formed on the photoconductive element. The second color toner image is transferred over the first color toner image on the intermediate transfer unit. Toner images of the other colors are sequentially formed in the same manner, transferred over the toner image on the intermediate transfer unit, and a full-color image is formed and transferred to paper.

It is necessary for preferable development to set the developing roller and photoconductor parallel to one another.

Thus, in the prior art, a plurality of recesses is formed in the circumference of the side plates of the front and rear sides of a holding unit, over the circumferential direction, and a developing roller is mounted by fitting both ends of its center shaft into a recess.

A holding unit has to be made by press work when the material of its side plate is sheet metal, and by injection molding when the material is plastic. In either case, a precision mold must be used.

However, considering the precision of a producible mold, later press work and injection molding accuracy, it is difficult to make the recesses with the theoretically demanded positioning accuracy, and it becomes impossible to produce a good image.

Thus, clamping an optional concave support member to the circumference of a pair of side plates of a holding unit over its rotating direction by means of a plurality of screws, and fitting through a bearing both ends of the center shaft of a developing roller to the support members of the pair of side plates has been considered.

In this case, it is possible to position the concave support members by a jig, and it is also possible to ensure the positioning accuracy of the support members by increasing the positioning accuracy of the jig.

However, in the prior art, since all optional support members are positioned by a jig, it is possible to ensure the relative positioning accuracy of the jig and support members, but the positioning accuracy is lowered between the side plate and support members.

Thus, when the front and rear side plates are made in one body by connecting them through a shaft and a stay member and a developing roller is provided between these side plates, there arises a problem that a twist is generated before and after the holding unit and it becomes difficult to keep a developing roller and an image holding member parallel.

BRIEF SUMMARY OF THE INVENTION

The present invention has been made in order to solve the above problems. It is an object of the present invention is to provide a method of assembling a developing apparatus which can keep a developing roller and an image holding member parallel without twisting a holding unit.

According to an embodiment of the present invention, there is provided a method of assembling a developing apparatus comprising, forming a recess in the outer circumference of a pair of holding members; preparing an adjustment jig having a first positioning pin and a second positioning pin, and fitting the first positioning pin of the adjustment jig into the recess without a clearance; after the fitting, fitting a concave support member on the second positioning pin without a clearance, and positioning and mounting them on the outer circumference of the holding member; after the fitting, separating the first and second positioning pins of the adjustment jig from the recess and the support member; after the separation, assembling the pair of holding members in one body with a predetermined interval; and after the assembly, mounting a plurality of developing rollers by fitting both ends of the center shaft into the recess of the pair of holding members and the concave support member, respectively.

According to another embodiment of the present invention, there is provided a method of assembling a developing apparatus comprising, forming a first recess and a second recess in the outer circumference of a pair of holding members over its rotating direction; preparing an adjustment jig having a first positioning pin and a second positioning pin, and fitting the first positioning pin of the adjustment jig into the first recess without a clearance, and fitting the second position pin into the second recess with a clearance; after the fitting, fitting a first concave support member on the first positioning pin, and fitting a second concave support member on the second positioning pin without a clearance, and positioning and mounting them on the outer circumference of the holding member; after the mounting, separating the first and second positioning pins of the adjustment jig from the first and second support members; after the separation, assembling the pair of holding members in one body with a predetermined interval; and after the assembly, mounting a plurality of developing rollers by fitting both ends of the center shaft into the first recess of the pair of holding members and the second concave support member, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Hereinafter, the present invention will be explained in detail by referring to the embodiments shown in the attached drawings.

Figure 1:
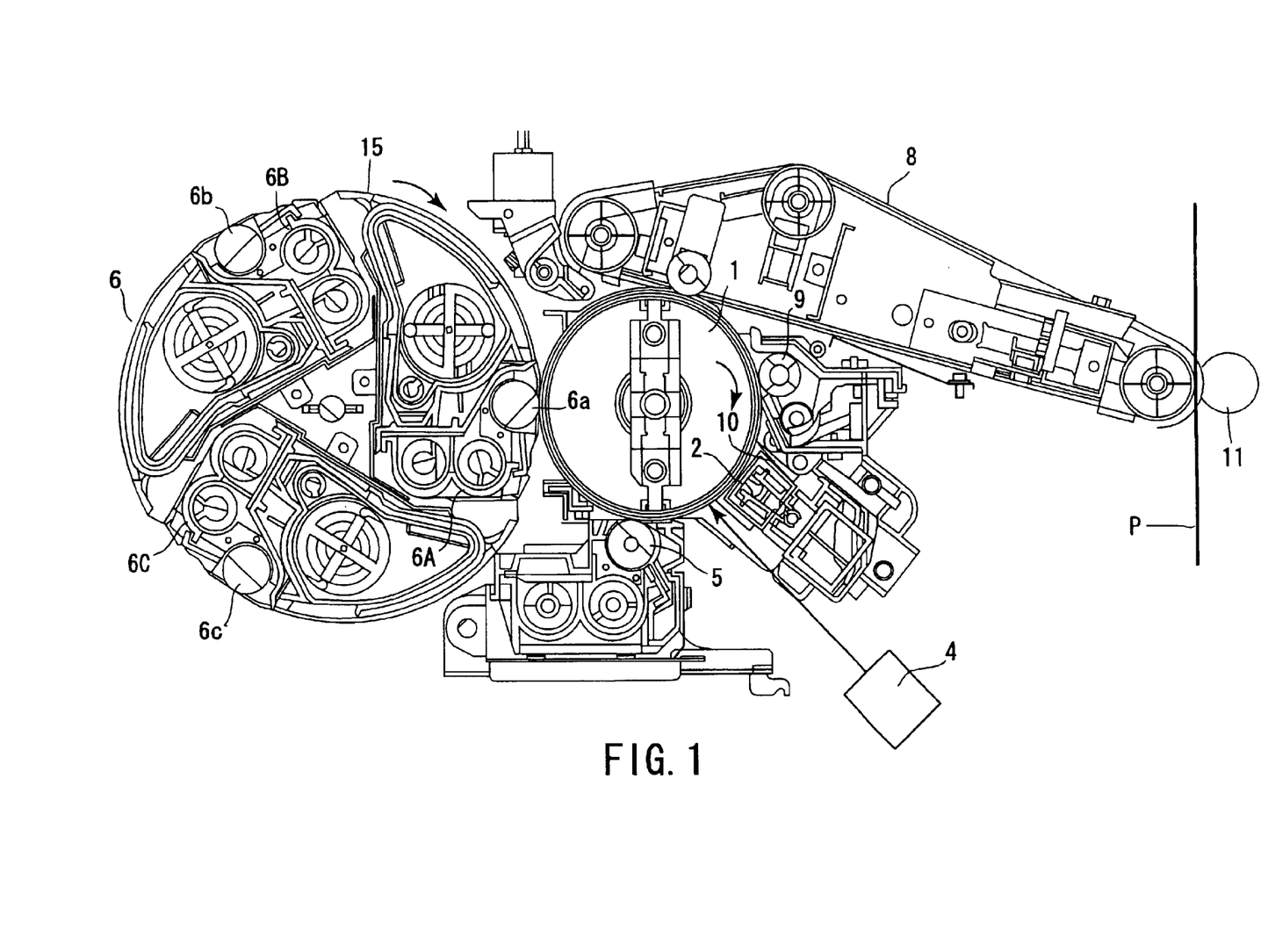
FIG. 1 is schematic diagram showing an internal structure of a color electrophotographic copier according to one embodiment of the present invention.

FIG. 1 is schematic diagram showing an internal structure of a color electrophotographic copier according to one embodiment of the present invention.

In the drawing, a reference numeral 1 denotes a rotary drum photoconductor as an image holding member. On the circumference of the photoconductor 1, an electrifying charger 2, an exposure unit 4 as an electrostatic latent image forming device, a monochrome developing unit 5, a color developing unit 6, an intermediate transfer member 8, a cleaning unit 9 and a de-electrifying charger 10 are arranged along the drum rotating direction (indicated by an arrow). A transfer roller 11 is arranged opposite to the intermediate transfer member 8.

The electrifying charger 2 electrifies the surface of the photoconductor 1, and the exposure unit 4 forms an electrostatic latent image on the surface of the photoconductor 1. The developing units 5 and 6 develop an electrostatic latent image. The intermediate transfer member 8 temporarily transfers a toner image on the photoconductor 1, and the transfer roller 11 transfers a toner image on the intermediate transfer member 8 to paper P. The cleaning unit 9 eliminates residual toner on the photoconductor 1. The de-electrifier 10 de-electrifies the surface of the photoconductor 1.

The color developing unit 6 has a rotatable holding unit 15, and the rotatable holding unit 15 holds first to third developing units 6A, 6B and 6C over its rotating direction.

The first developing unit 6A contains yellow toner, and has a developing roller 6a which supplies the yellow toner. The second developing unit 6B contains magenta toner, and has a developing roller 6b which supplies the magenta toner. The third developing unit 6C contains cyan toner, and has a developing roller 6c which supplies the cyan toner.

Next, the image forming process will be explained.

First, the surface of the photoconductor 1 is electrified by the electrifying charger 2, image information light is radiated from the exposure unit 4 onto the surface of the electrified photoconductor 1, and an electrostatic latent image is formed. In color development, the electrostatic latent image is sent to the developing position opposite to the first developing unit 6A by the rotation of the photoconductor. At this position, the yellow toner is supplied to the electrostatic latent image by the rotation of the developing roller 6a, and the image is developed. The yellow toner image is transferred to the intermediate transfer member 8.

After the transfer operation, the toner remaining on the photoconductor 1 is eliminated by the cleaning unit 9, and the surface of the photoconductor 1 is electrified again. Image information light is radiated from the exposure unit 4 onto the surface of the charged photoconductor 1, and an electrostatic latent image is formed.

The electrostatic latent image is sent to the developing position by the rotation of the photoconductor 1, but before the latent image reaches the developing position, the second developing unit 6B is moved to the developing position by the rotation of the holding unit 15. When the electrostatic latent image reaches the developing position, toner (magenta) of a different color from the first color (yellow) is supplied, and a second color toner image is formed.

The second color toner image is transferred over the first color toner image on the intermediate transfer member 8. Thereafter, the third color toner image is formed on the photoconductor 1, and transferred over the image on the intermediate transfer member 8, and a color image is formed. The color image is collectively transferred to the paper P by the transfer roller 11.

The paper P with transferred color image is carried to a fixing unit not shown in the drawing, where it is heated and pressurized, and the color image is fixed to the paper P.

Figure 2:
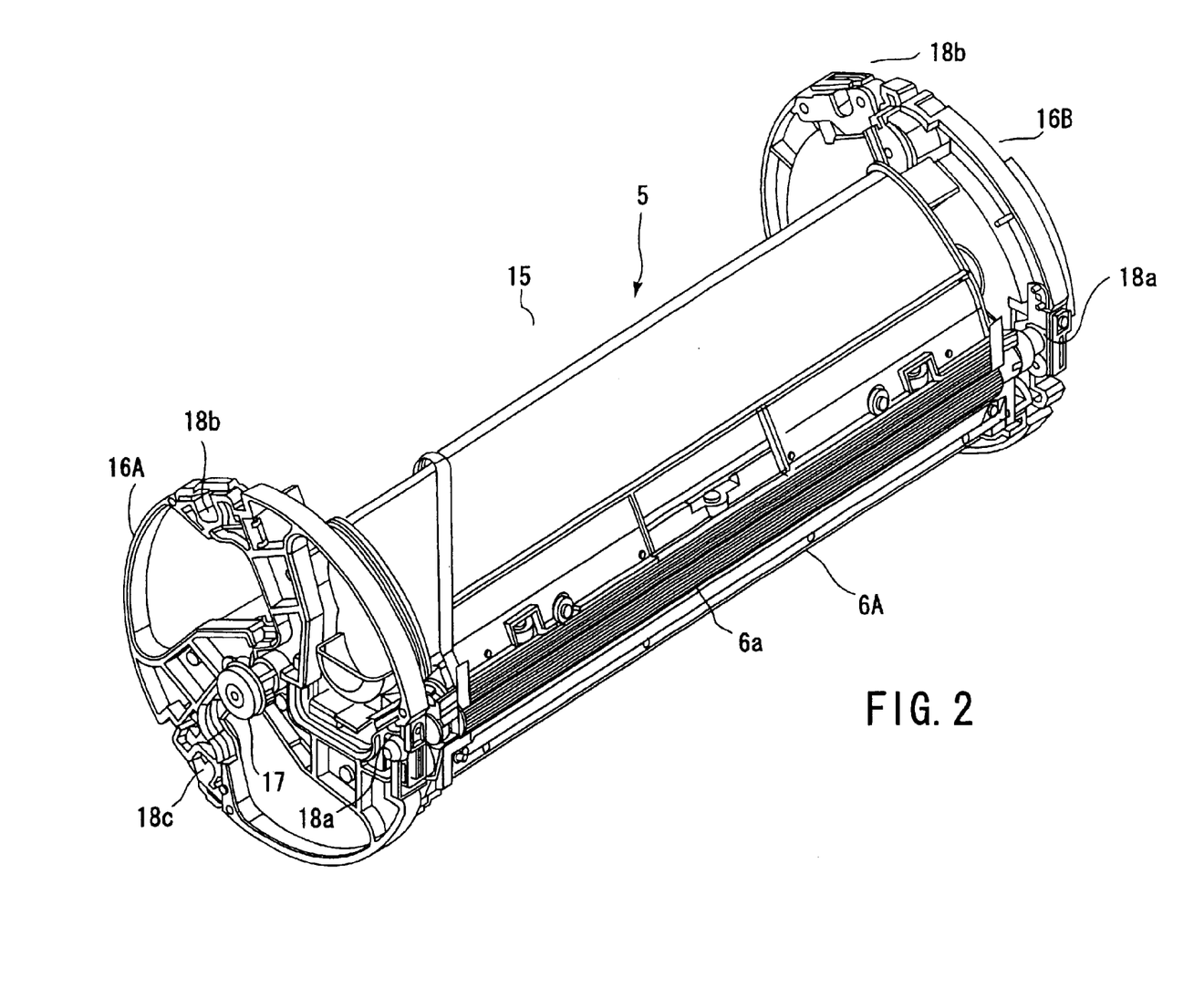
FIG. 2 is a perspective view showing a holding unit in FIG. 1.

FIG. 2 is a perspective view showing the holding unit 15 holding the first developing unit 6A of FIG. 1.

The holding unit 15 has rotors 16A and 16B as a holding member in its front and rear sides. The rotors 16A and 16B are connected and assembled in one body through a shaft 17 as a connecting member. On the circumference of the rotors 16A and 16B, first to third recesses 18a, 18b and 18c are formed at regular intervals over its rotating direction.

Figure 3:
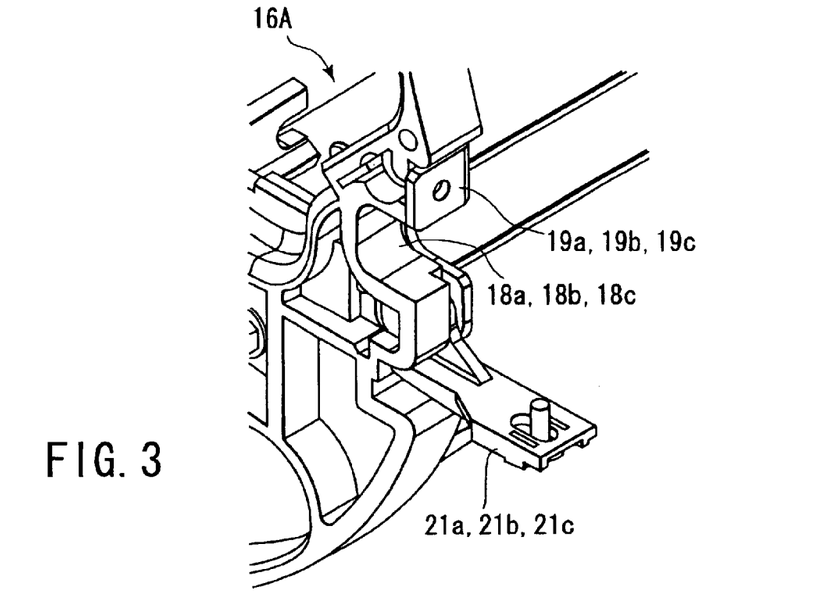
FIG. 3 is a magnified perspective view of a support member of a rotor of the front side of the holding unit in FIG. 2.
Figure 4:
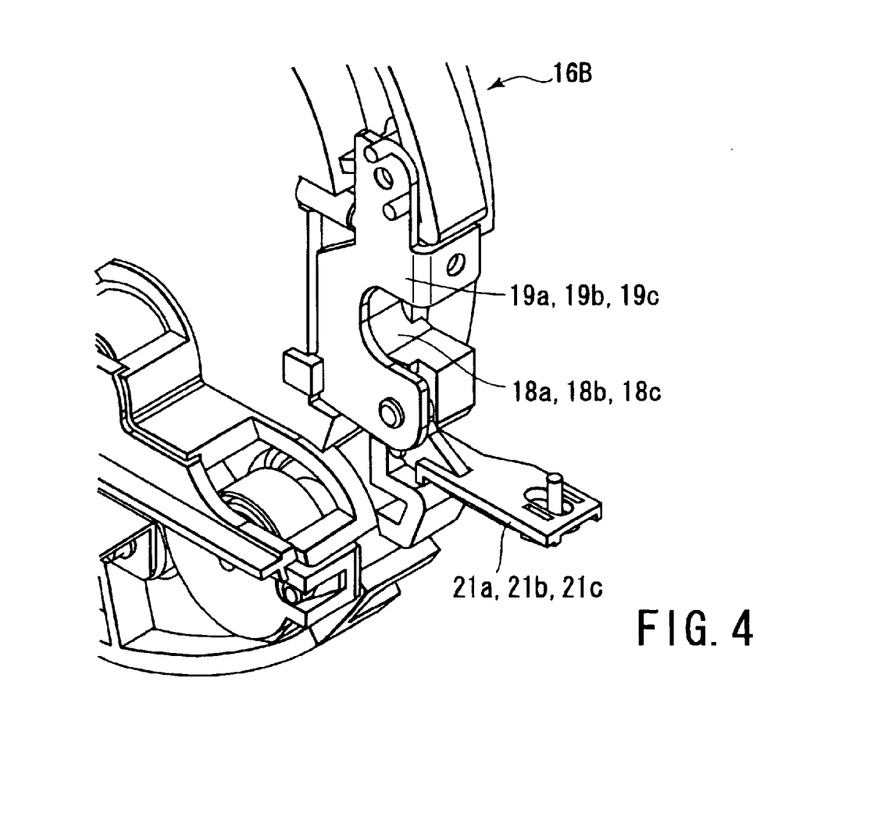
FIG. 4 is a magnified perspective view of a support member of a rotor of the rear side of the holding unit in FIG. 2.

The rotors 16A and 16B are equipped with first to third concave adjusting sheet metals 19a–19c adjoining the first to third recesses 18a–18c, as shown in FIG. 3 and FIG. 4.

The first recess 18a functions as a support member for supporting both ends of a center shaft 20a of the developing roller 6a. The second and third adjusting sheet metals 19b and 19c function as support members for supporting both ends of the center shafts 20b and 20c of the developing rollers 6b and 6c.

The first to third adjusting sheet metals 19a–19c are rotatively provided with holder brackets 21a–21c holding both ends of the center shafts 20a–20c of the first to third developing rollers 6a–6c.

Description will now be given on the method of assembling the above-mentioned holding unit 5 based on FIG. 5–FIG. 12.

Figure 5:
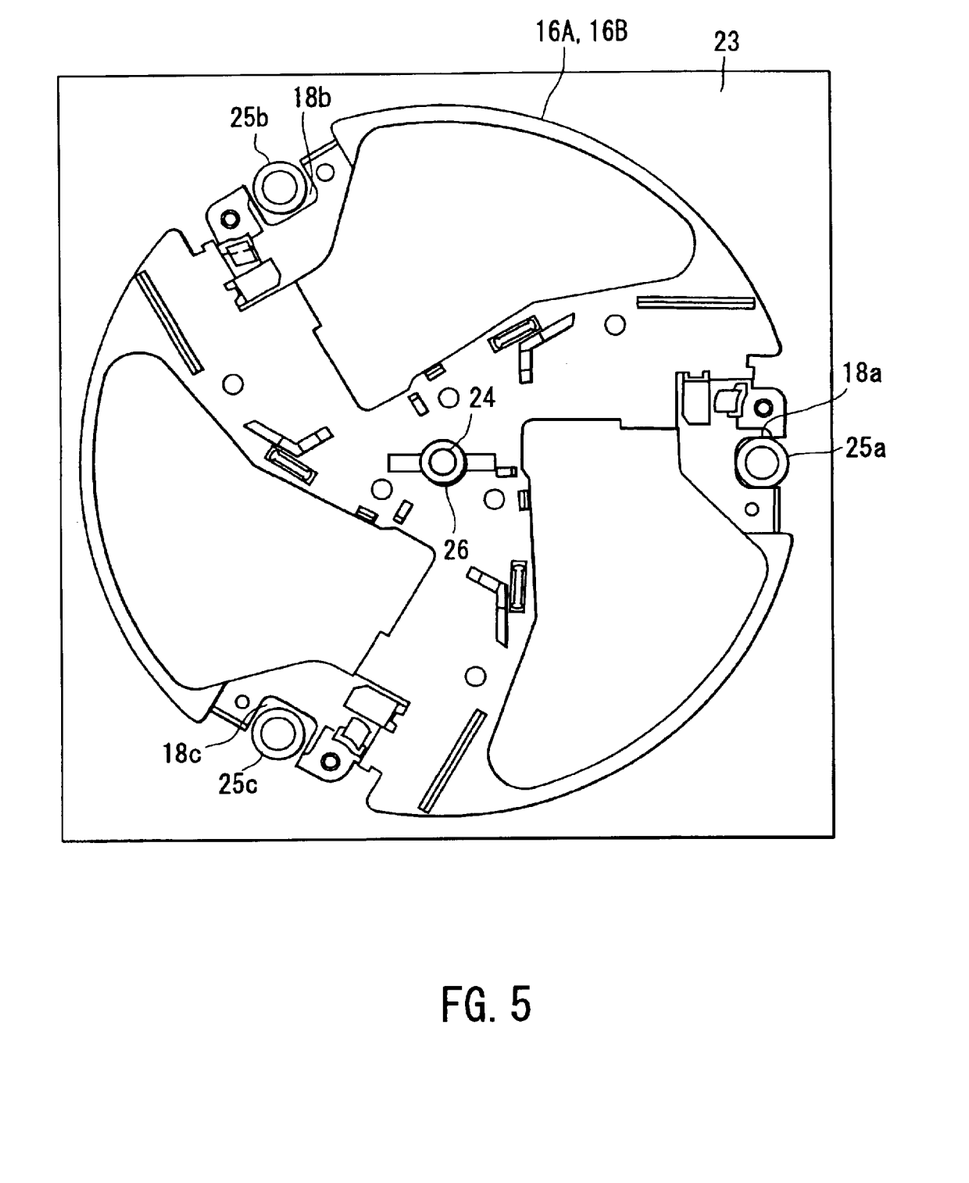
FIG. 5 is a front view showing a positioning pin of an adjustment jig, fitting into the recess of a rotor of the holding unit.

First, prepare an adjustment jig 23 which is provided with a center pin 24 and first to third positioning pins 25a, 25b and 25c projecting on a base plate. The outer diameters of the first to third pins 25a, 25b and 25c are almost the same as the outer diameters of the bearings at both ends of the center shafts 20a–20c of the first to third developing rollers 6a–6c.

Figures 6, 7:
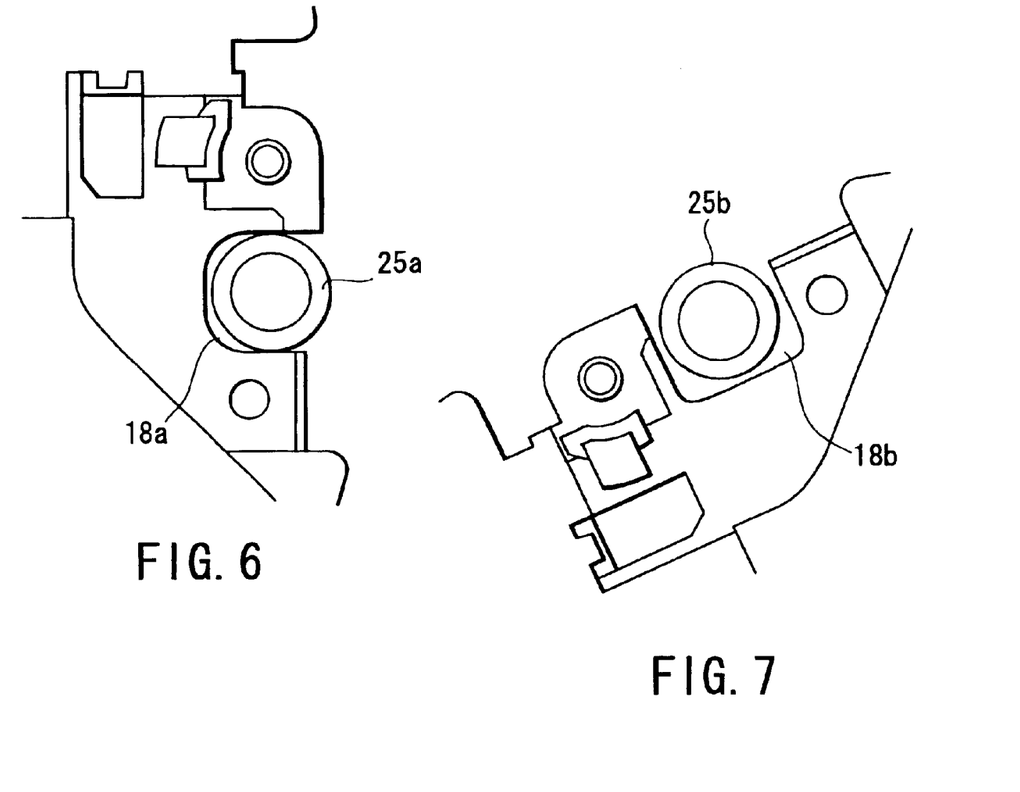
FIG. 6 is a magnified front view of the recess of the rotor of FIG. 5, fitting on the positioning pin of the adjustment jig.
FIG. 7 is a magnified front view of the recess of the rotor of FIG. 5, fitting on the positioning pin of the adjustment jig.
Figure 8:
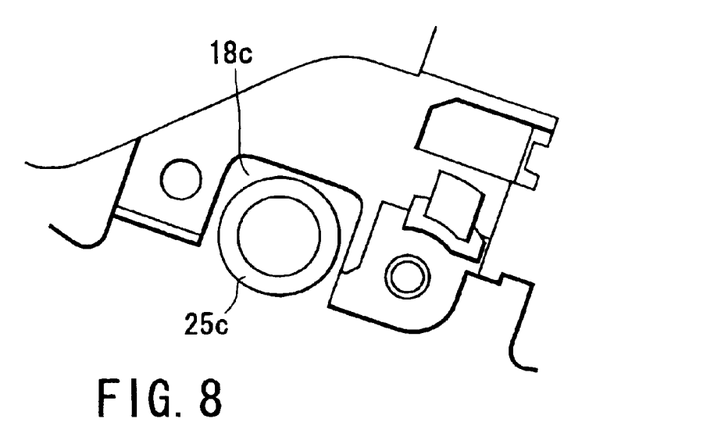
FIG. 8 is a magnified front view of the recess of the rotor of FIG. 5, fitting on the positioning pin of the adjustment jig.

Insert the center pin 24 of the adjustment jig 23 into the center hole 26 of a rotor 16A (16B), and fit the first to third positioning pins 25a–25c into the thirst to third recesses 18a to 18c. The first recess 18a fits on the first positioning pin 25a without a clearance, as shown in FIG. 6, and the second and third recesses 18b and 18c fit on the second and third positioning pins 25b and 25c with a clearance, as shown in FIG. 7 and FIG. 8.

Figure 9:
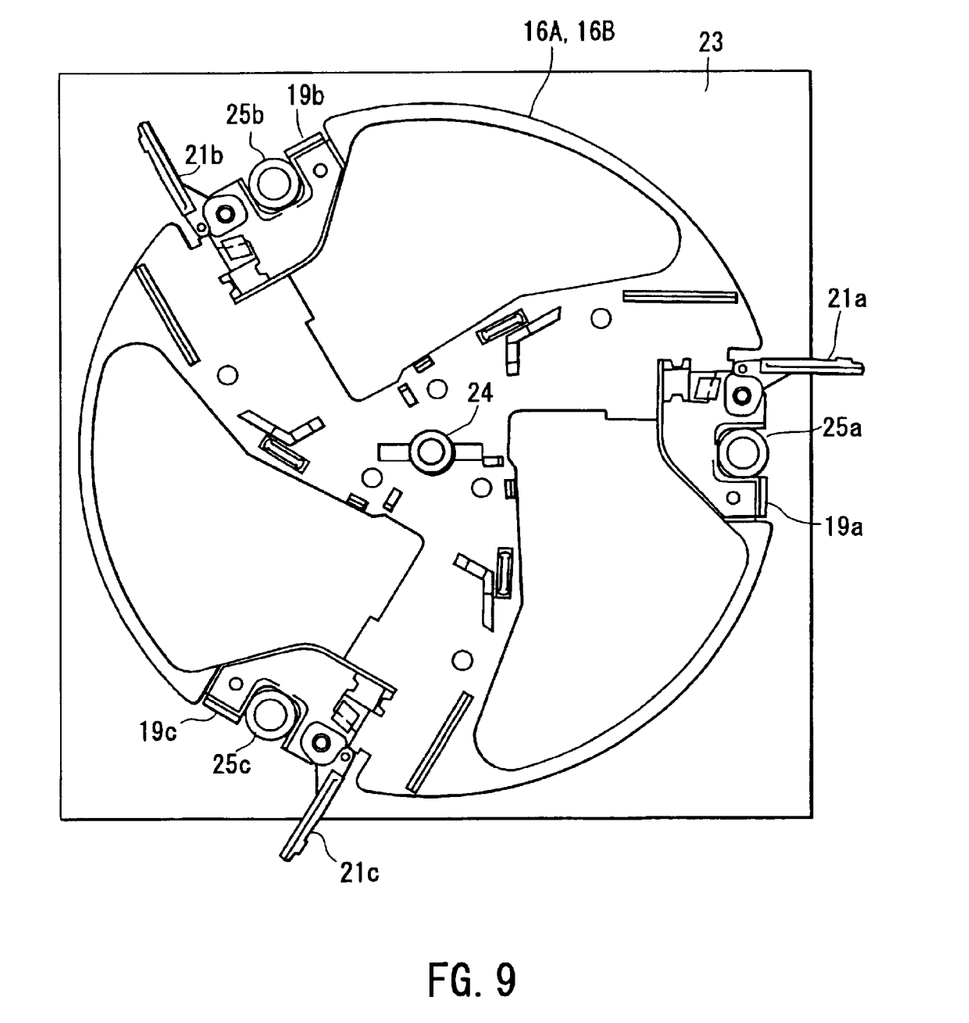
FIG. 9 is a front view of the rotor of FIG. 5 equipped with an adjusting sheet metal and a holder bracket.

Thereafter, as shown in FIG. 9, fix the first to third adjusting sheet metals 19a–19c and the holder brackets 21a–21c to the rotor 16A (16B), as shown in FIG. 9, and fit these first to third adjusting sheet metals 19a–19c on the first to third positioning pins 26a–25c.

At this time, the first positioning pin 25a is fitted in the first adjusting sheet metal 19a with a clearance, and the second and third positioning pins 25b and 25c are fitted in the adjusting sheet metals 19b and 19c without a clearance.

Figure 10:
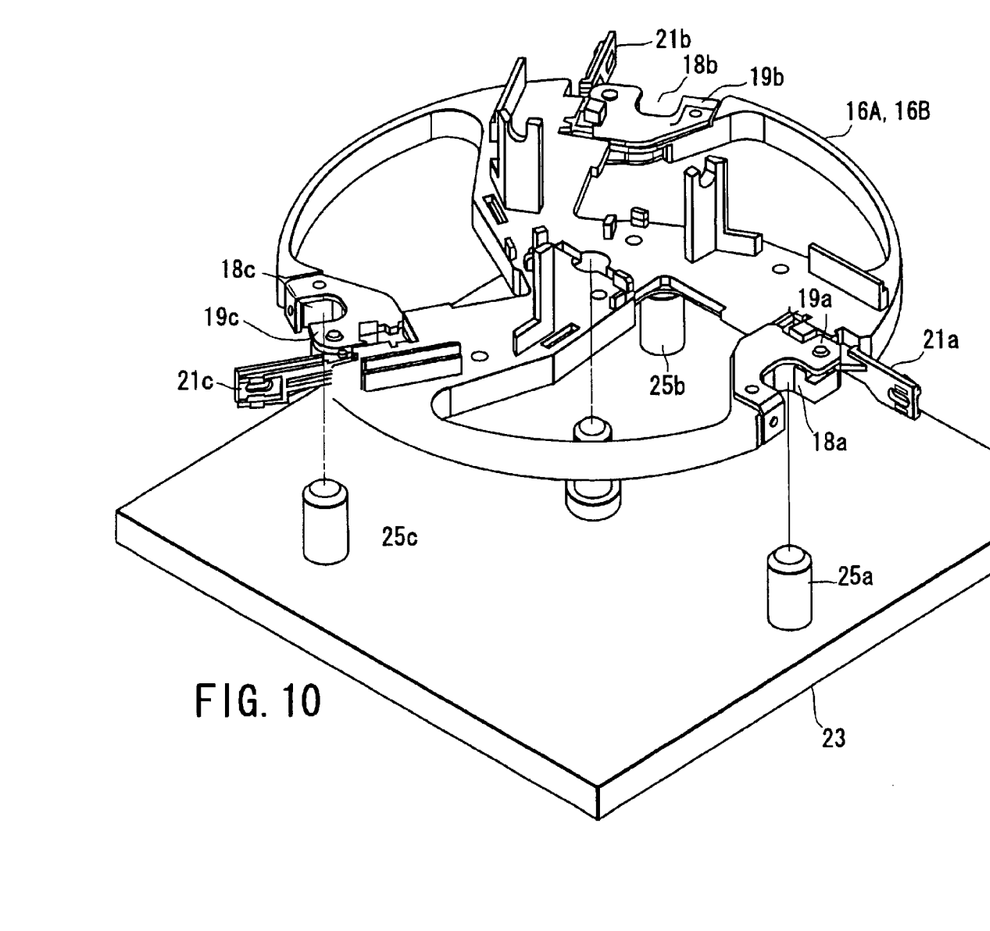
FIG. 10 is a perspective view of the rotor of FIG. 5 with the adjustment jig removed.

After fixing the first to third adjusting sheet metals 19a–19c and holder brackets 21a–21c, as described above, remove the adjustment jig 23 as shown in FIG. 10.

Figure 11:
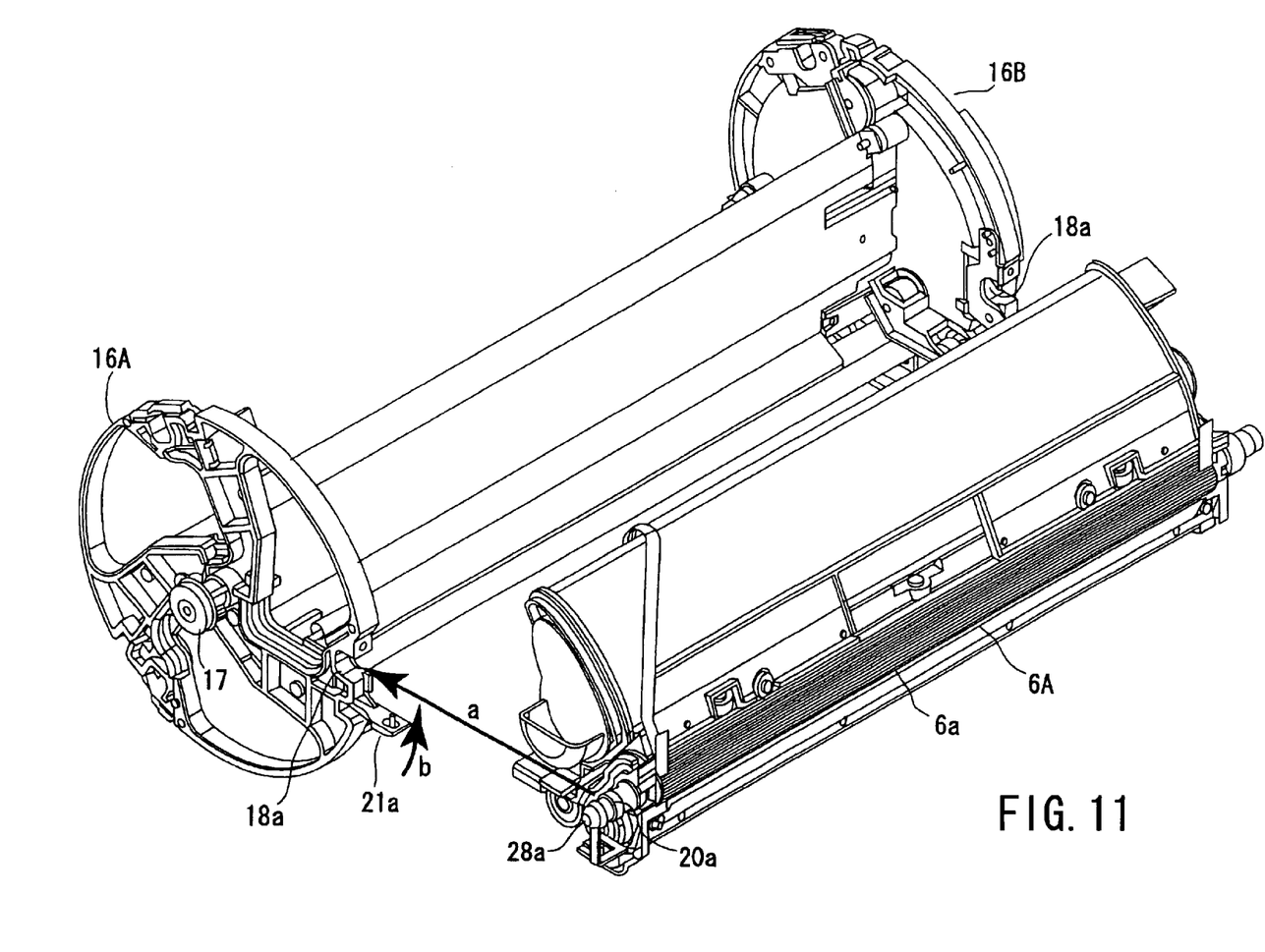
FIG. 11 is a perspective view showing the rotor of FIG. 10 assembled, and a first developing unit to be equipped to the rotors.

Thereafter, as shown in FIG. 11, connect a pair of rotors 16A (16B) through the shaft 17 as a connecting member, and assemble them as a single unit. Then, fit both ends of the center shaft 20a of the developing roller 6a of the first developing unit 6A with the first recess 18a of the rotors 16A and 16B of the front and rear sides without a clearance through the bearing 28a. Then, fit both ends of the center shafts 20b and 20c of the second and third developing rollers 6b and 6c, in the second and third adjusting sheet metals 19b and 19c through the bearing.

Figure 12:
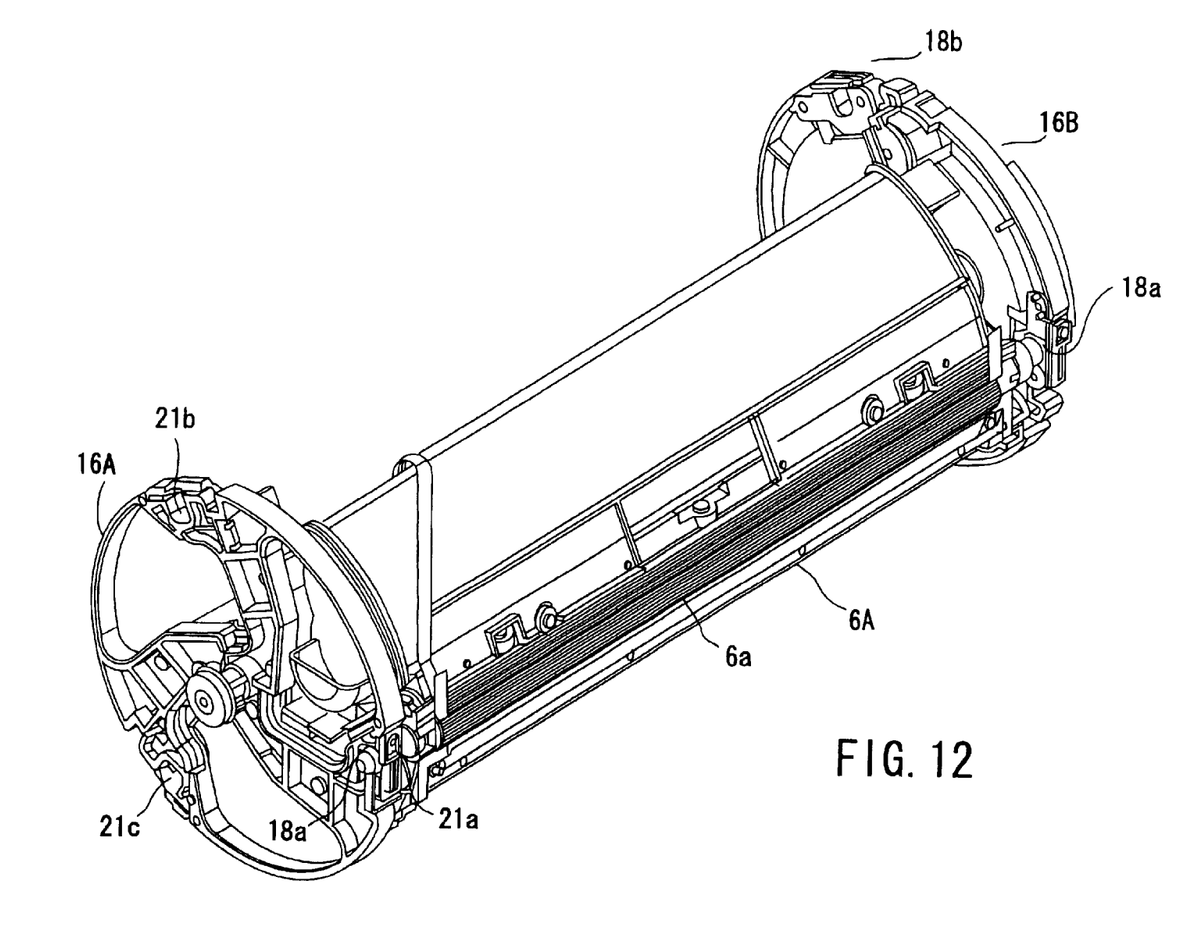
FIG. 12 is a perspective view of the rotor of FIG. 11 equipped with a first developing unit.

After assembling as described above, rotate the holder brackets 21a–21c upward and close them, and hold the bearing at both ends of the center shafts 20a–20c, and fix the first to third developing units 6A–6C, as shown in FIG. 12.

As explained above, according to this embodiment, the recess 18a is directly formed in the rotor 16A (16B), the first positioning pin 25a of the adjustment jig 23 fitted into this recess 18a of the rotor 16A (16B) without a clearance, and the second and third adjusting sheet metals 19b and 19c fitted to the second and third positioning pins 25b and 25c of the adjustment jig 23 without a clearance. Thus, it is possible to increase the positioning accuracy of the second and third adjusting sheet metals 19b and 19c with respect to the rotor 16A (16B), and the parallelism between the developing rollers 61–6c and the photoconductor 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of assembling a developing apparatus comprising:

forming a recess in the outer circumference of a pair of holding members;

preparing an adjustment jig having a first positioning pin and a second positioning pin, and fitting the first positioning pin of the adjustment jig into the recess without a clearance;

after said fitting, fitting a concave support member on the second positioning pin without a clearance, and positioning and mounting the support member on the outer circumference of the holding member;

after said fitting, separating the first and second positioning pins of the adjustment jig from the recess and the support member;

after said separation, assembling said pair of holding members in one body with a predetermined interval; and after said assembly, mounting a plurality of developing rollers by fitting both ends of the center shaft into the recesses of said pair of holding members and the concave support members, respectively.

2. The method of assembling a developing apparatus according to claim 1, further comprising providing a plurality of support members over the rotating direction of the holding member.

3. The method of assembling a developing apparatus according to claim 1, further comprising fixing a holder bracket to the support member which holds both ends of the center shaft of the developing roller supported by the support member.

4. A method of assembling a developing apparatus comprising:

forming a first recess and a second recess in the outer circumference of a pair of holding members over its rotating direction;

preparing an adjustment jig having a first positioning pin and a second positioning pin, and fitting the first positioning pin of the adjustment jig into the first recess without a clearance, and fitting the second position pin into the second recess with a clearance;

after said fitting, fitting a first concave support member on the first positioning pin, and fitting a second concave support member on the second positioning pin without a clearance, and positioning and mounting them on the outer circumference of the holding member;

after said mounting, separating the first and second positioning pins of the adjustment jig from the first and second support members; after said separating, assembling said pair of holding members in one body with a predetermined interval; and after said assembly, mounting a plurality of developing rollers by fitting both ends of the center shaft into the first recesses of said pair of holding members and the second concave support members, respectively.

5. The method of assembling a developing apparatus according to claim 4, further comprising providing a plurality of second support members over the rotating direction of the holding member.

6. The method of assembling a developing apparatus according to claim 4, further comprising fixing a holder bracket to the first and second support members which holds both ends of the center shaft of the developing roller.

* * * * *